(12) United States Patent
Bourges

(10) Patent No.: US 7,726,900 B2
(45) Date of Patent: Jun. 1, 2010

(54) SYSTEM FOR CONNECTING TWO SHAFTS IN TRANSLATION

(75) Inventor: Bernard Bourges, Avelin (FR)

(73) Assignee: E.C.L. (FR)

( * ) Notice: Subject to any disclaimer, the term of this patent is extended or adjusted under 35 U.S.C. 154(b) by 0 days.

(21) Appl. No.: 10/595,905

(22) PCT Filed: Nov. 16, 2004

(86) PCT No.: PCT/FR2004/002918

§ 371 (c)(1), (2), (4) Date: May 18, 2006

(87) PCT Pub. No.: WO2005/050032

PCT Pub. Date: Jun. 2, 2005

(65) Prior Publication Data

US 2007/0127983 A1    Jun. 7, 2007

(30) Foreign Application Priority Data

Nov. 18, 2003  (FR) .................................. 03 13446

(51) Int. Cl.
*B25D 9/04* (2006.01)
*B25G 3/12* (2006.01)
*B25G 3/22* (2006.01)
*B25D 9/06* (2006.01)

(52) U.S. Cl. ............................ 403/313; 403/24; 403/59; 403/286; 81/463; 173/171; 279/19.1; 279/19.6; 279/97

(58) Field of Classification Search .................. 403/24, 403/59, 229, 286, 293, 309, 310, 313; 91/277; 173/19, 91, 118, 121, 128, 210, 171; 175/293, 175/299, 300; 81/463–466, DIG. 12; 439/319, 439/700; 279/16, 17, 19, 19.1, 19.6, 19.7, 279/76, 97
See application file for complete search history.

(56) References Cited

U.S. PATENT DOCUMENTS 50,190 A * 9/1865 Watson ........................ 403/310

(Continued)

FOREIGN PATENT DOCUMENTS

| EP | 121610 A1 * | 10/1984 |
| EP | 0539955 A | 5/1993 |
| EP | 0716165 | 6/1996 |
| FR | 641446 A | 8/1928 |
| FR | 1107422 A | 12/1955 |
| FR | 2499644 A | 8/1982 |
| FR | 2516607 A | 5/1983 |
| GB | 300037 A | 11/1928 |

*Primary Examiner*—Daniel P Stodola
*Assistant Examiner*—Ernesto Garcia
(74) *Attorney, Agent, or Firm*—Banner & Witcoff, Ltd.

(57) ABSTRACT

A system for providing a mechanical and electrical connection between the ends of two essentially-coaxial shafts (1 and 2), whereby each shaft end includes a groove (11, 12) close to an axial end extension (17 and 8; 18 and 9). Moreover, the aforementioned ends are connected inside a sleeve (10) including the following: a first annular shoulder (13) having a shape that is complementary to that of the groove of the first shaft, such that there is no clearance therebetween; a second annular shoulder (14) having a shape that is complementary to that of the groove (12) of the second shaft, but with a clearance therebetween; and a cavity (16) which is intended to receive the shaft ends, said cavity having an axial height which is greater than the sum of the axial heights of the axial end extensions (17 and 8; 18 and 9). Further, the axial end extensions (17 and 8; 18 and 9) of the two shafts are in permanent mechanical and electrical contact.

13 Claims, 3 Drawing Sheets

U.S. PATENT DOCUMENTS

| | | | | |
|---|---|---|---|---|
| 2,320,619 A | * | 6/1943 | Larsson | 403/59 |
| RE24,269 E | * | 1/1957 | Disser | 173/211 |
| 3,032,360 A | * | 5/1962 | Woodings | 403/338 |
| 3,108,644 A | * | 10/1963 | Gustafson | 173/118 |
| 3,224,082 A | * | 12/1965 | Moulin | 81/463 |
| 3,326,303 A | * | 6/1967 | Jones, Jr. | |
| 3,363,220 A | * | 1/1968 | Redd et al. | 439/700 |
| 3,467,415 A | * | 9/1969 | Sandor | 403/59 |
| 4,024,688 A | * | 5/1977 | Calini | 403/310 |
| 4,289,367 A | * | 9/1981 | Everett | |
| 4,377,452 A | | 3/1983 | Casdas | |
| 4,434,859 A | * | 3/1984 | Rumpp et al. | 279/19.4 |
| 4,783,897 A | * | 11/1988 | Basnett | 403/285 |
| 4,921,438 A | * | 5/1990 | Godfrey et al. | |
| 5,078,849 A | * | 1/1992 | Sagbraten | |
| 5,261,449 A | * | 11/1993 | Smetters | 403/310 |
| 5,427,468 A | | 6/1995 | Muellenberg | |
| 5,788,608 A | * | 8/1998 | Wilkinson | |
| 5,914,023 A | * | 6/1999 | Roy et al. | |
| 6,099,196 A | * | 8/2000 | Lancelot, III | 403/313 |
| 6,988,551 B2 | * | 1/2006 | Evans | 175/303 |
| 7,163,058 B2 | * | 1/2007 | Bakke | 175/299 |
| 2002/0013085 A1 | * | 1/2002 | Boyle et al. | |

* cited by examiner

SYSTEM FOR CONNECTING TWO SHAFTS IN TRANSLATION

CROSS REFERENCE TO RELATED APPLICATIONS

This application claims, under 35 U.S.C. §119, the benefit of priority of the filing date of Nov. 16, 2004 of a Patent Cooperation Treaty patent application, Serial Number PCT/FR2004/002918, filed on the aforementioned date, which is incorporated herein by reference, wherein Patent Cooperation Treaty patent application Serial Number PCT/FR20041002918 was not published under PCT Article 21(2) in English.

This application also claims, under 35 U.S.C. §119, the benefit of priority of the filing date of Nov. 18, 2003 of French patent application, Serial Number FR 03 13446, filed on the aforementioned date, which is incorporated herein by reference.

BACKGROUND OF THE INVENTION

1. Field of the Invention

The present invention relates to a mechanical and electrical connection system between the ends of two approximately coaxial shafts, which move along an overall axial direction and that can transmit approximately axial forces. This type of configuration is used particularly when it is required to separate a shaft in two parts, to protect one of its ends from significant conditions (temperatures, stresses, lateral shocks, etc.) endured by the other end.

This invention more particularly relates to crustbreaking devices used in electrolytic aluminium production pots. These are used to break the surface crust of the solidified bath. They are often associated either with metering devices that supply alumina to the pot, or to measurement devices used to measure the temperature and level of electrolyte in the pot so as to enable regulated supply of the bath with alumina.

2. Description of the Related Art

ALUMINIUM PECHINEY patent FR 2 483 965 describes such a crustbreaking device in which the crustbreaker, also called a plunger, is associated with an axial displacement mechanism. It is placed vertically, and periodically descends to break the solidified bath crust at the supply point or to keep the hole formed in the crust open, such that the alumina brought in through a pipe can penetrate into the molten electrolyte. For several reasons explained in FR 2 483 965, it is important to detect if the plunger comes into contact with molten electrolyte or with solidified electrolyte during its downward movement. Detection of the contact between the end of the plunger (called the chisel) and the molten electrolyte is made by measuring an electrical voltage between the plunger and a point on the cell used as the reference potential. Typically, the plunger is electrically isolated from the superstructure of the pot, and when the chisel comes into contact with the molten electrolyte bath, its electrical potential is close to the potential of the molten electrolyte. The measurement of this potential is used as information to send the order to raise the plunger.

Patent EP-B-0 716 165 describes a crustbreaking device surrounding and protecting a measurement device that not only measures the bath level but also its temperature. For this device, it is also important to detect the moment at which the plunger comes into contact with the molten electrolyte, and the crustbreaker is also provided with a detection device based on measurement of an electrical voltage between the plunger and a point on the cell used as a reference potential.

The plunger is subjected to violent thermal and mechanical conditions near the chisel. As the time that the chisel remains in the electrolyte bath increases, the risk of formation of a crust on its surface as it rises increases, and this crust can get thicker during subsequent operations, causing problems with operation and premature wear of the plunger.

The plunger must not be excessively deformed and must be electrically reliable, otherwise it will not operate correctly; it must remain electrically isolated from the pot superstructure at all times and it must always be able to carry an electrical current to detect contact with the electrolyte bath. Furthermore, since the chisel can wear quickly and deform progressively, it is important to provide a means of replacing it easily and regularly. Finally, the other end of the plunger is connected to an axial movement control device, typically a jack, that can only operate correctly at a temperature close to ambient temperature and provided that no excessive mechanical loads are applied to it, since it is particularly sensitive to lateral shocks.

For all these reasons, the plunger has been decoupled into two approximately coaxial parts; a rod associated with the control jack and a rod (called the extension) that is fitted with the chisel at one of its ends. These two parts are usually connected to each other by a screw-nut system but this system is not fully satisfactory since it transmits mechanical shocks resisted by the chisel without really damping them, particularly sudden lateral forces that prevent smooth operation of the jack. Furthermore, loosening problems frequently occur with the screw-nut system (for example when the chisel has to be replaced) and cannot guarantee a reliable permanent electrical contact.

Therefore, the applicant has developed a connecting system between the two parts of the plunger that does not have these disadvantages.

BRIEF SUMMARY OF THE INVENTION

The invention consists of a mechanical and electrical connection system between the ends of two approximately coaxial shafts that move along an overall axial direction (100) and are capable of transmitting approximately axial forces, one of the shafts called the "driving shaft" being connected to an axial translation device, typically a jack, and the other shaft called the "driven shaft" typically being equipped with a measurement device. This system is characterised in that:
  the end of the driving shaft that will come into contact with the end of the driven shaft comprises an annular groove close to an axial end extension, with axial height H1,
  the end of the driven shaft that will come into contact with the end of the driving shaft comprises an annular groove close to an axial extension, with axial height H2,
  the ends are connected inside an approximately cylindrical coupling, the coupling being provided with:
    a first annular shoulder, with a shape complementary to the shape of the annular groove located close to the axial extension of the end of the driving shaft, without clearance,
    a second annular shoulder, with a shape complementary to the shape of the annular groove close to the axial extension of the end of the driven shaft, a radial clearance being provided between the complementary surfaces of the annular shoulder of the coupling and the annular groove in the driven shaft,
    a cavity that will contain the end axial extensions of the shafts and for which the axial height is strictly greater than the sum of the axial heights H1 and H2 of the end axial extensions;

and in that the corresponding end axial extensions of the driving shaft and the driven shaft remain in permanent mechanical and electrical contact due to an elastic conducting means, typically a metallic helical spring.

According to the invention, the first annular shoulder of the coupling has a shape complementary to the shape of the annular groove of the driving shaft, with no clearance, while the second annular shoulder of the coupling has a shape complementary to the shape of the annular groove of the driven shaft, a radial clearance being provided between the complementary surfaces of the annular shoulder of the coupling and the annular groove of the driven shaft.

Since there is no clearance between the groove of the driving shaft and the shoulder of the coupling, it is possible to make the axes of the two coincide. On the other hand, the clearance formed between the complementary surfaces of the annular shoulder of the coupling and the annular groove of the driven shaft reduces the amplitude of lateral shocks imposed on the driven shaft at the chisel and transmitted to the driving shaft through the coupling.

Preferably, the annular groove of the driving shaft has a U-section, such that it has two walls perpendicular to the axis separated by a distance equal to an axial height H0, and a "bottom" in the form of a cylindrical surface coaxial with the axis with diameter C and the section of the first annular shoulder of the coupling is also overall a U shape, with two walls perpendicular to the axis at a distance equal to a value very slightly less than H0, typically H0−$\epsilon$, where 0.05 mm$\leq\epsilon\leq$0.2 mm, and a cylindrical wall with a diameter C very slightly greater than the diameter of the annular groove, typically C+$\epsilon$', where 0.05 mm$\leq\epsilon'\leq$0.2 mm.

Also preferably, the section of the annular groove of the driven shaft has two walls perpendicular to the axis separated by a distance equal to an axial height H3 and a cylindrical "bottom" with diameter G and the section of the second annular shoulder of the coupling is also overall in a U shape, with two walls perpendicular to the axis at a distance equal to a value H4 less than H3, and a cylindrical wall with a diameter greater than the diameter of the annular groove of the driven shaft. Finally, to complete the clearance formed between the inner surface of the coupling and the outer surface of the end of the driven shaft and thus reduce the amplitude of lateral shocks that could be transmitted through the coupling to the driving shaft, a radial clearance is formed between the outer surface of the end axial extension of the driven shaft and the wall of the cavity formed in the coupling designed to hold the end axial extensions of the two shafts.

Also preferably, the end axial extension of the driving shaft comprises a projection, the final end of which has a transverse wall that occupies a plane surface or a surface of revolution with respect to the axis of the shaft, convex and with low curvature at its mid-point, while the end axial extension of the driven shaft comprises a projection, for which the final end has a transverse wall with a profile such that when the two shafts are put into contact, the contact area between the projection and the driving shaft is located at a point as close as possible to the axis of the driving shaft. For example, this type of transverse wall may have a convex surface of revolution about the axis of the driven shaft, with a greater curvature at its mid-point than the curvature of the transverse wall of the projection of the driving shaft.

Preferably, the end axial extensions of each shaft comprise a base located between the annular groove and the projection. The base and the projection are arranged such that the elastic conducting means can bear on each of the shafts, such that there is a continuous electrical contact between the two shafts. The base of each end axial extension may be cylindrically shaped with a diameter greater than the diameter of the projection, such that an offset is formed between the base and the projection. If the elastic conducting means is a metallic helical spring, the shape and position of the offset and the shape of the helical spring are defined such that the spring is guided at its end in the axial direction by the projection, and the end of the spring bears in contact with the offset.

Also preferably, to avoid any lateral disturbance, all contact between the two shafts is avoided at any point other than the contact point between the projections, itself located as close as possible to the axis of the driving shaft. Thus, to avoid transmission of forces through the coupling, the end wall of the coupling located on the side of the driven shaft is arranged such that it cannot come into contact with the driven shaft, even after deformation or wearing of the contact surfaces between the two shafts. Thus, when the geometries of the grooves and the U-shaped shoulders are modified, the difference H3−H4, in other words the difference between the axial height H3 of the annular groove in the driven shaft and the axial height H4 of the second annular shoulder of the coupling, must remain greater than the maximum clearance that can exist between the corresponding ends of the projections of the driving shaft and the driven shaft.

In one preferred embodiment of the invention, the end of the driving shaft comprises an annular groove and an end axial extension that are adjacent to each other, such that since the cylindrical base of the end axial extension has a diameter greater than the diameter of the annular groove, a transverse wall is formed that will come into contact with the first shoulder of the coupling. Similarly, the end of the driven shaft comprises an annular groove and an end axial extension, that are adjacent to each other, such that since the cylindrical base of the end axial extension has a diameter greater than the diameter of the annular groove, a transverse wall is formed that will come into contact with the second shoulder of the coupling. In this way, the second shoulder of the coupling is separated from the first shoulder such that together they delimit the cavity within the coupling into which the end axial extensions of the shaft will fit.

In practice, the coupling can be made in several pieces, for example two shells in the form of half cylinders, comprising the first and second shoulders on their inner face. These shells are placed such that the first and second shoulders are facing the annular grooves in the driving and driven shafts, and are then held fixed to each other by means of a cylindrical sleeve slid onto one end of one of the shafts and that is made to slide so that it covers the assembly of the two previously assembled shells. This sleeve is then fixed in place using conventional systems such as pins passing through the sleeve and one of the shells, retaining ring, nut, needle screw, etc. The coupling and the sleeve are preferably made of metal, typically steel or brass.

Of course, the geometries may be inverted; the shafts may be provided with annular shoulders and the coupling may be provided with one first and one second annular groove, with complementary shapes. Similarly, the corresponding shapes of the ends of the projections can be interchanged. Also, the association of the coaxial alignment of the coupling on the driving shaft (no clearance between the annular groove in the driving shaft and the first shoulder of the coupling) and the radial and axial clearances formed between the annular groove of the driven shaft and the second shoulder of the coupling may be replaced by a symmetrical combination: coaxial alignment of the coupling on the driven shaft (no clearance between the annular groove of the driven shaft and the second shoulder of the coupling) associated with radial and axial clearances formed between the annular groove of the driving shaft and the first shoulder of the coupling.

To better understand the invention, we will describe a particular embodiment specifically adapted to crustbreaking systems used in electrolytic pots.

DETAILED DESCRIPTION OF THE INVENTION

Figure 1:
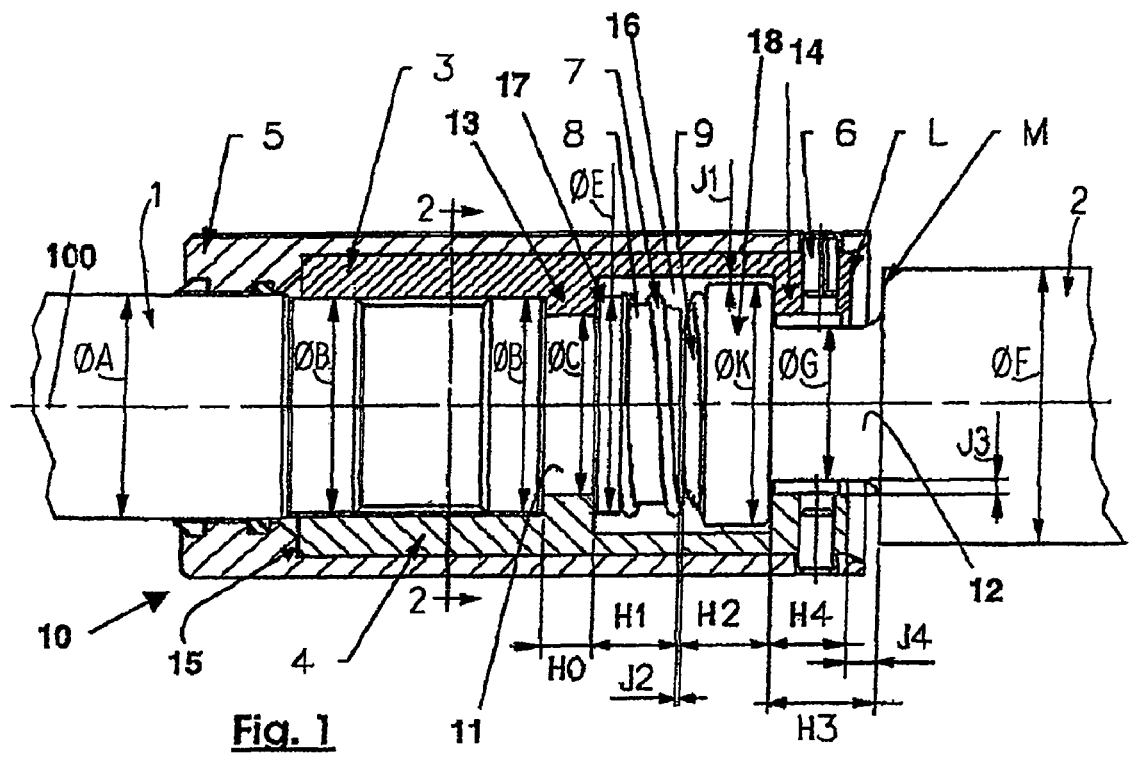
FIG. 1 illustrates a diametric section through a system according to the invention.
Figure 2:
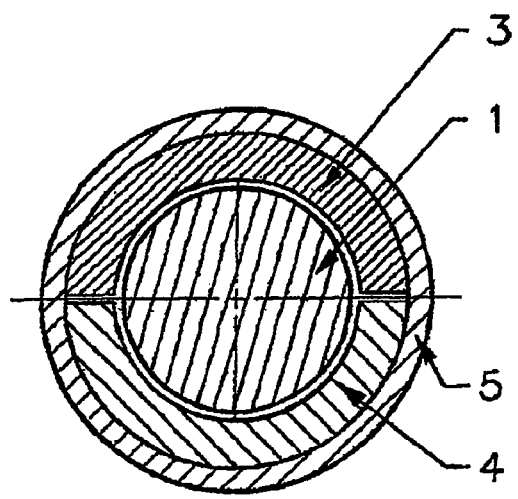
FIG. 2 is a section along the plane 2-2 of the system shown in FIG. 1.
Figure 3:
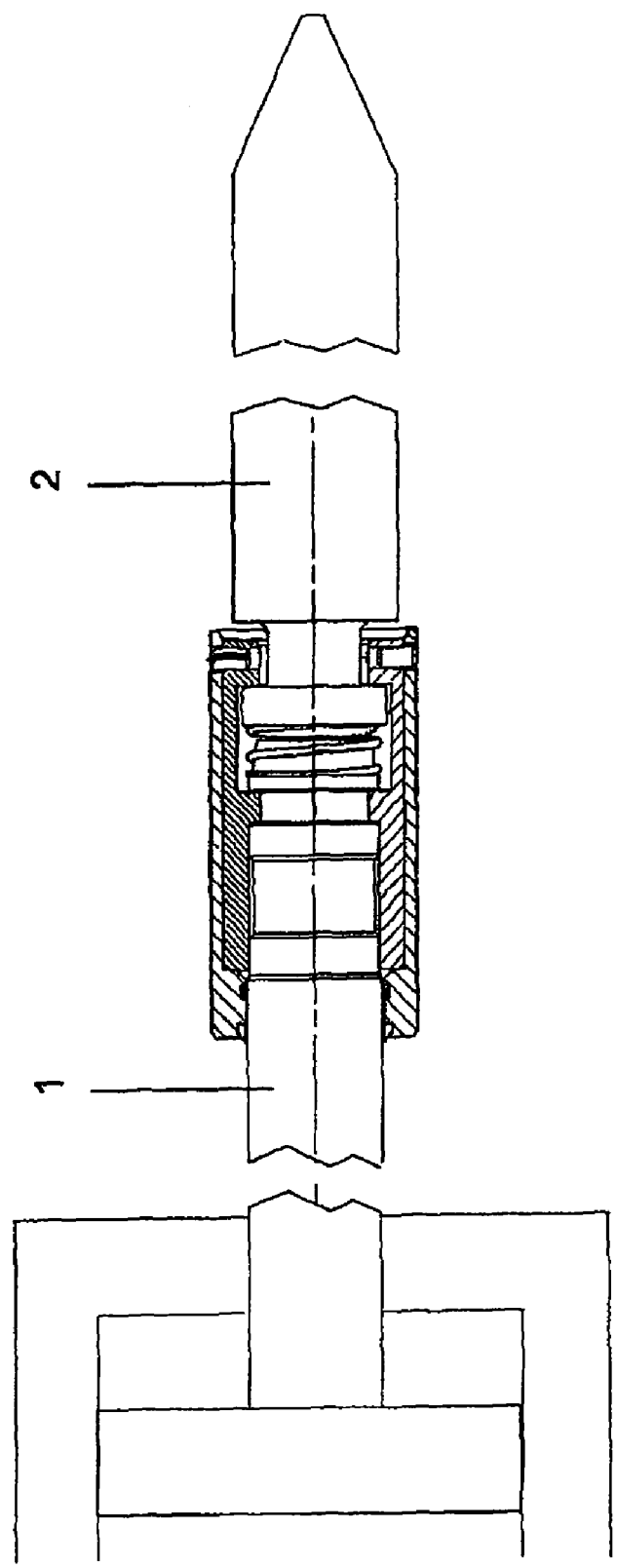
FIG. 3 illustrates a diametric section through a system that includes an axial translation device and a chisel, according to an embodiment of the invention.
Figure 4:
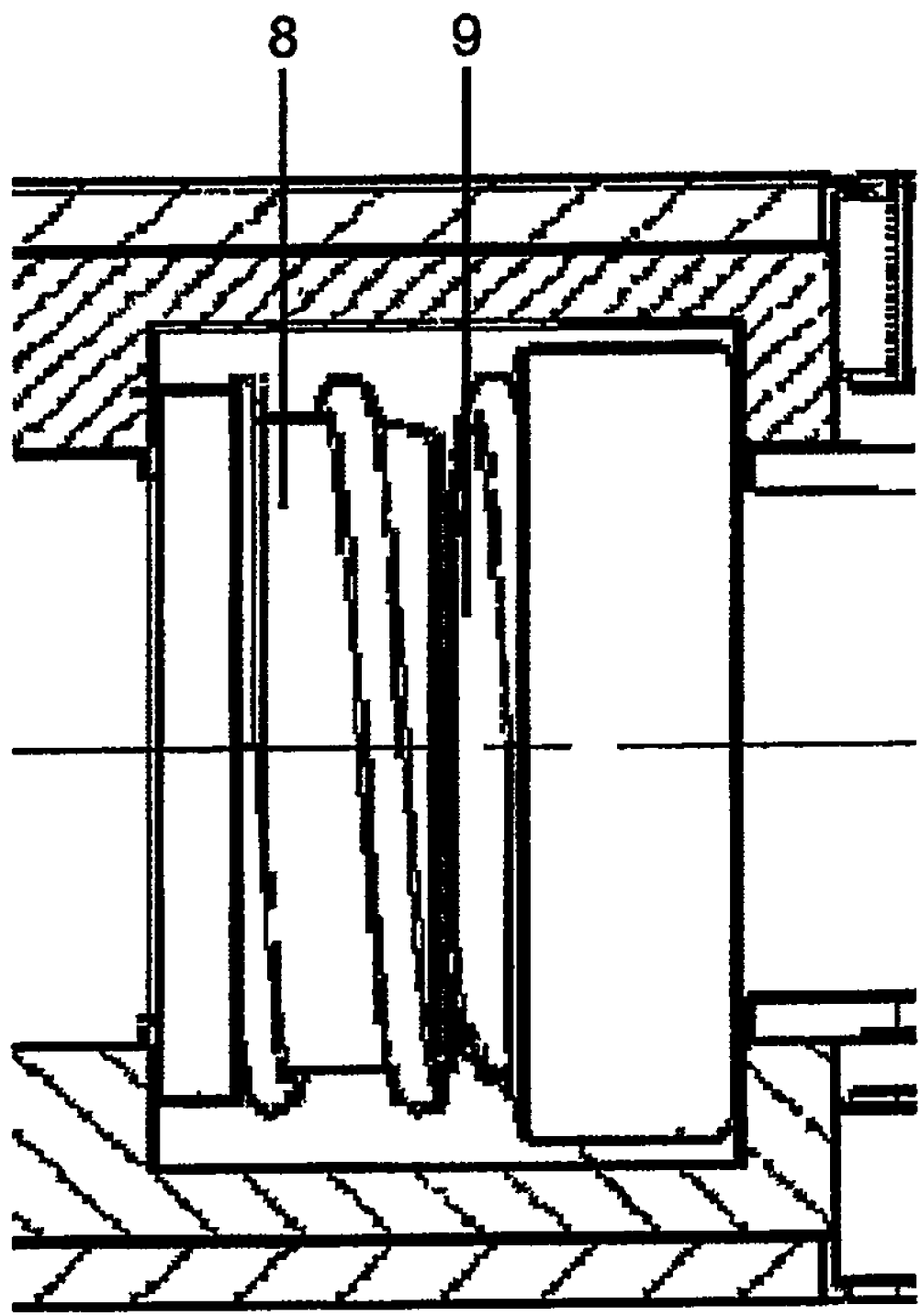
FIG. 4 illustrates a diametric section through a system according to an embodiment of the invention, in which the end of the driven shaft contacts the end of the driving shaft.

The system represented according to FIG. 1 shows a connecting means between two shafts 1 and 2. This means is designed so as to enable the shaft 1 to drive the shaft 2 in translation in the two directions, either by pulling it or pushing it. Shaft 1 has its own guidance system in translation (not shown). Shaft 2 also has its own guidance system in translation (not shown) and radial forces on shaft 2 must not cause any radial force on the shaft 1 (or as little as possible). Furthermore, the connecting system between these two shafts must be easily separable without any risk of damaging parts.

To obtain this result:

a) The shaft 1 called the driving shaft with diameter ØA has an alignment area with diameter ØB for the proposed system. The two contact areas with diameter ØB are slightly smaller than the diameter ØA so that they pass freely into the guiding element of the driving shaft 1 on diameter ØA.

The end of the driving shaft 1 is provided with a circular groove 11 with inside diameter ØC and width—or axial height—H0 such that the first shoulder of the proposed connecting system can be inserted. Thus, this connecting system is centered on the diameters ØB and is connected in translation by a shoulder 13 that fits into the groove 11 with inside diameter ØC and width H0.

The end of the driving shaft 1 is provided with an end axial extension with height H1 close to the circular groove 11. This extension comprises a cylindrical base 17 with diameter ØE and a projection 8. The diameter ØE of the end of the driving shaft 1 may be equal to diameter ØB or very slightly smaller (only a few tenths of millimeter so that the shoulder is sufficient).

b) The shaft 2 called the driven shaft with diameter ØF has a groove 12 with diameter ØG and width H3 enabling a second shoulder 14 of the proposed connecting system to fit into it. Thus, when this connecting system is in position, the two shafts are connected in translation.

The end of the driven shaft 2 is also provided with an axial end extension with height H2 close to the annular groove 12. This extension includes a cylindrical base 18 with diameter ØK and a projection 9. The profile of the end of this projection 9 is such that when the driving shaft 1 and the driven shaft 2 come into contact, their contact point is located at the smallest possible distance from the axis of the driving shaft 1. Thus, if the guides of shafts 1 and 2 are offset, the contact between these two shafts is made close to their axis, for example when shaft 1 pushes shaft 2.

c) The connecting system comprises a coupling 10 composed of three main parts: two identical shells 3 and 4 in the form of half cylinders, each with two complementary shoulders that form the annular shoulders 13 and 14 of the coupling after the shells come into contact. The first shoulder 13 fits into the annular groove 11 of the driving shaft 1, with no clearance. The second shoulder 14 fits into the groove 12 of the driven shaft 2, with clearance. These two shells have a half bore with diameter ØB so that they are centered on the diameter ØB of the driving shaft 1.

The two shells 3 and 4 are made from a cylindrical part that is fully machined to obtain the functions described above and is then cut along an axial plane so as to obtain two identical pieces. They are held in position by a sleeve 5 that is centered on their outer diameter so as to keep them perfectly in position with respect to the driving shaft 1. The sleeve 5 is fixed in translation with respect to the half shells 3 and 4 by a shoulder 15 and two pins 6 centered in each of the two shells 3 and 4 and fitting into two holes drilled diametrically opposite in the sleeve 5. The sleeve immobilization system is described for guidance with the understanding that other systems such as a retaining ring, nut, or needle screws could be used.

To enable displacement of the shaft 2 with respect to the shaft 1, the connecting system is designed such as to leave:

A radial clearance J1 between the connecting part (the coupling 10) and the base of the axial extension of the driven shaft 2. The cavity 16 formed in the coupling 10 to hold the axial end extension of the driving shaft 1 and the axial end extension of the driven shaft 2 is a bore, the diameter of which is defined such that there is a radial clearance J1 between this bore and the diameter ØK of the cylindrical base 18 of the end axial extension of the driven shaft 2.

An axial clearance J2 between two ends of the shafts 1 and 2. The second shoulder 14 is separated from the first shoulder 13 such that together they delimit the cavity 16—that will hold the ends—in the coupling 10, the axial height of the cavity being strictly greater than the sum of the axial heights H1 and H2 of the end axial extensions of the shafts.

A radial clearance J3 between the bottom of the groove 12 in the driven shaft 2 and the 2nd shoulder 14 of the connecting system.

An axial clearance J4 between the end L of the connecting system and the side M of the groove 12 in the driven shaft 2 such that there is no contact in this area, even after deformation of the ends of the two shafts. Thus, to avoid transmission of forces through the coupling 10, the end wall L of the coupling located on the side of the driven shaft 2 is arranged such that it cannot come into contact with the driven shaft, even after deformation or wearing of contact surfaces between the two shafts. Thus, the difference between the axial height H3 of the annular groove 12 of the driven shaft 2 and the axial height H4 of the annular shoulder 14 of the coupling 10 always remains greater than the maximum clearance J2 that can exist between the corresponding ends of the projection 8 of the driving shaft 1 and the projection 9 of the driven shaft 2.

This system immobilising the two shafts 1 and 2 in translation is applied firstly in crustbreaking systems and alumina supply systems for aluminium electrolytic pots. The connection between the rod of the pneumatic crustbreaking jack with the extension rod that supports the chisel is thus made.

In fact, the driving shaft 1 is the rod of the pneumatic jack and the driven shaft 2 is the extension rod that supports the chisel. This system enables a mechanical connection between the shafts 1 and 2 and due to this perfectly controlled connection, a contact spring 7 can be installed between the two rods so that an electrical signal can be passed from one rod to the other and thus enable measurement of an electric potential between the end of the chisel and a point on the electrolytic pot used as a reference.

Construction measures related to the bearings and guidance of the spring 7 on each of the rods are such that, regardless of the forces or movements applied to each of the rods, continuity of current transfer is guaranteed. The spring 7 is a helical metallic spring centered on each of the ends of the jack rod (driving shaft 1) and the extension rod that supports the chisel (driven shaft 2). The shape and position of the base 17 and the projection 8 of the jack rod 1, the shape and position of the base 18 and the projection 9 of the extension rod 2, and the shape of the spring 7 itself are defined so that the spring 7 always has good bearing on each rod, so that the spring is permanently in contact on these ends.

Centering of the spring 7 on the rod 1 and centering of the spring 7 on rod 2 are designed such that the spring 7 can follow the relative axial and radial displacements of the two rods 1 and 2 without being damaged.

I claim:

1. A mechanical and electrical connection system comprising:
    a driving shaft connected to an axial translation device and having an end comprising an annular groove proximate to an axial end extension, the axial end extension having an axial height (H1);
    a driven shaft approximately coaxial with the driving shaft, the driven shaft having an end comprising an annular groove proximate to an axial end extension, the axial end extension having an axial height (H2); and
    a generally cylindrical coupling connecting the ends, the coupling including:
        a first annular shoulder with a surface having a shape complementary to the shape of the annular groove proximate to the axial end extension of the driving shaft without clearance;
        a second annular shoulder with a surface having a shape that fits into the annular groove proximate to the axial end extension of the driven shaft, a radial clearance provided between the surfaces of the second annular shoulder and the annular groove of the driven shaft; and
        a cavity containing the axial end extensions of the shafts and having an axial height, the axial height of the cavity strictly greater than the sum of the axial heights (H1) and (H2) of the axial end extensions,
        a helical spring in direct mechanical and electrical contact with both the axial end extension of the driving shaft and the axial end extension of the driven shaft,
        wherein the driving shaft and driven shaft are movable along an overall axial direction, and are capable of transmitting approximately axial forces, and
        wherein the end of the driven shaft is capable of making direct contact with the end of the driving shaft.

2. The system according to claim 1, wherein the annular groove of the driving shaft includes two walls perpendicular to the axis of the driving shaft and separated by a distance of about an axial height (H0), and a bottom comprising a cylindrical surface with a diameter (ØC) coaxial with the axis of the driving shaft, and
    wherein the first annular shoulder is also provided with two walls perpendicular to the axis of the coupling, the two walls separated by a distance of the axial height (H0)−$\epsilon$, where 0.05 mm $\leqq \epsilon \leqq$ 0.2 mm, and a cylindrical wall having a diameter (ØC)+$\epsilon'$, where 0.05 mm $\leqq \epsilon' \leqq$ 0.2 mm.

3. The system according to claim 1, wherein the annular groove of the driven shaft includes two walls perpendicular to the axis of the driven shaft and separated by a distance of about an axial height (H3), and a bottom in the form of a cylindrical surface with a diameter (ØG) coaxial with the axis of the driven shaft, and wherein the second annular shoulder has two walls perpendicular to the axis of the coupling and separated by a fifth axial height (H4) strictly less than the axial height (H3), and a cylindrical wall with a diameter strictly greater than the diameter (ØG) of the annular groove of the driven shaft.

4. The system according to claim 1, wherein there is a radial clearance (J1) between an outer surface of the axial end extension of the driven shaft and the wall of the cavity formed in the coupling for holding the axial end extensions of the shafts.

5. The system according to claim 1, wherein the difference between the axial height of the cavity and the sum of the axial heights (H1) and (H2) corresponds to a maximum clearance (J2) between the shaft ends, and the difference between the axial height (H3) of the annular groove of the driven shaft and the axial height (H4) of the second annular shoulder of the coupling corresponds to a maximum clearance (J4) strictly greater than the maximum clearance (J2) between the shaft ends.

6. The system according to claim 1, wherein the axial end extension of the driving shaft comprises a projection having an end with a wall, the axial end extension of the driven shaft comprising a projection having an end with a wall, wherein, when the two shafts are put into contact with each other, the area of contact between the projection of the driven shaft and the projection of the driving shaft is located as close as possible to the axis of the driving shaft.

7. The system according to claim 6, wherein the wall of the projection of the axial end extension of the driven shaft comprises a curvature at its mid-point greater than a curvature of the wall of the projection of the driving shaft.

8. The system according to claim 6, wherein the axial end extensions of each shaft include a base located between the annular groove and the projection of the shafts, the base and the projection being arranged such that the helical spring bears on each of the shafts to provide continuous electrical contact respectively between the two shafts.

9. The system according to claim 1, wherein the axial end extension of the driving shaft comprises a cylindrical base having a diameter (ØE) greater than the diameter of the annular groove (ØC) and being formed to contact the first shoulder of the coupling, and
    wherein the axial end extension of the driven shaft comprises a cylindrical base having a diameter (ØK) greater than the diameter of the annular groove (ØG) and being formed to contact the second shoulder of the coupling, the second shoulder separated from the first shoulder, the first and second shoulders defining the cavity within the coupling.

10. The system according to claim 1, wherein the coupling comprises two shells in the form of half cylinders comprising the first shoulder and the second shoulder on their respective inner faces, the two shells placed to have the first shoulder and the second shoulder facing the annular grooves in the driving shaft and the driven shaft and fixedly held by a cylindrical sleeve slid onto one end of one of the shafts.

11. The system according to claim 10, wherein the sleeve is fixed at one end using a shoulder that provides a stop for the shells and fixed at the other end by attachment means for securing each shell to the sleeve.

12. The system according to claim 11, wherein the attachment means is one or more fasteners selected from the group consisting of a pin passing through the sleeve, a retaining ring, a nut, and a needle screw.

13. The system according to claim 1, wherein the driving shaft is a rod of a pneumatic jack and the driven shaft is an extension rod supporting a chisel.

* * * * *